United States Patent
King, II

(12) 
(10) Patent No.: US 8,948,698 B2
(45) Date of Patent: Feb. 3, 2015

(54) VEHICLE MULTIMEDIA HEAD UNIT WITH TWO BLUETOOTH ANTENNAS AND TWO RECEIVERS

(75) Inventor: Charles Joseph King, II, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 619 days.

(21) Appl. No.: 13/238,629

(22) Filed: Sep. 21, 2011

(65) Prior Publication Data

US 2013/0059538 A1   Mar. 7, 2013

Related U.S. Application Data

(60) Provisional application No. 61/530,567, filed on Sep. 2, 2011.

(51) Int. Cl.
| | |
|---|---|
| *H04B 7/00* | (2006.01) |
| *H04W 76/02* | (2009.01) |
| *H04W 4/04* | (2009.01) |
| *H04W 88/06* | (2009.01) |
| *H04L 29/08* | (2006.01) |

(52) U.S. Cl.
CPC ............ *H04W 76/025* (2013.01); *H04W 4/046* (2013.01); *H04W 88/06* (2013.01); *H04L 67/12* (2013.01)

USPC ....... 455/41.3; 455/41.2; 455/569.2; 455/345

(58) Field of Classification Search
CPC ..... H04W 4/00; H04W 4/046; H04W 76/025; H04W 88/06; H04W 88/02; H04W 92/18
USPC ........... 455/41.3, 41.2, 569.1, 569.2, 344, 99, 455/152.1
See application file for complete search history.

(56) References Cited

U.S. PATENT DOCUMENTS

| | | | |
|---|---|---|---|
| 7,257,427 B2 | 8/2007 | Diedrich et al. | |
| 7,826,945 B2 | 11/2010 | Zhang et al. | |
| 2008/0287064 A1 | 11/2008 | Weiss | |
| 2009/0068950 A1* | 3/2009 | Tkachenko et al. | 455/41.3 |
| 2009/0075624 A1 | 3/2009 | Cox et al. | |
| 2009/0209205 A1 | 8/2009 | Kramer et al. | |
| 2010/0120366 A1* | 5/2010 | DeBiasio et al. | 455/41.3 |

\* cited by examiner

*Primary Examiner* — Shaima Q Aminzay
(74) *Attorney, Agent, or Firm* — Gifford, Krass, Sprinkle, Anderson & Citkowski, P.C.

(57) ABSTRACT

Examples of the present invention include a head unit for a vehicle entertainment system, including a housing, a radio, a first wireless transceiver, and a second wireless transceiver. The second wireless transceiver may be used to provide a dedicated communications link between the head unit and another electronic device, such as an auxiliary unit. The second wireless transceiver may have a serial port profile (SPP), and may be a Bluetooth transceiver.

9 Claims, 5 Drawing Sheets

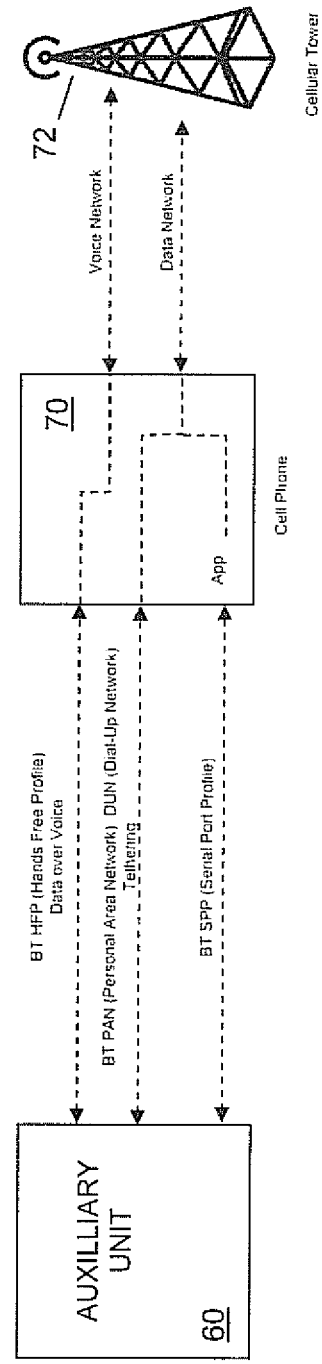

VEHICLE MULTIMEDIA HEAD UNIT WITH TWO BLUETOOTH ANTENNAS AND TWO RECEIVERS

REFERENCE TO RELATED APPLICATION

This application claims priority from U.S. provisional patent application Ser. No. 61/530,567, filed Sep. 2, 2011, the entire content of which is incorporated herein in its entirety.

FIELD OF THE INVENTION

The invention relates to automobiles, in particular in-car entertainment systems and communication properties thereof.

BACKGROUND OF THE INVENTION

In-car entertainment can be provided by the vehicle head unit. The head unit typically comprises a radio, CD player, and other entertainment capabilities. The head unit will typically be connected to a vehicle antenna, for example for receiving radio waves from the exterior.

A vehicle head unit may communicate with mobile electronics belonging to a vehicle occupant, such as the driver or passenger. For example, there may be an AUX socket for connecting a personal music player such as an iPod to the head unit using a cable.

The desired functionalities of the head unit may change over time, for example as different forms of mobile electronics become more prevalent. However, replacing the head unit may be difficult, expensive, and may compromise the aesthetic appearance of the vehicle.

SUMMARY OF THE INVENTION

Examples of the present invention include a vehicle multimedia head unit having two Bluetooth transmit antennas and two receivers. The additional Bluetooth antenna may be dedicated to interfacing with additional multimedia devices, which may include an auxiliary unit. In this context, an auxiliary unit is an electronic device external to the head unit, which provides additional functionality to the head unit. The auxiliary unit may be readily replaced, in comparison with the difficulty and expense of replacing the head unit. The additional Bluetooth antenna allows a dedicated communications channel to be established between the head unit and the auxiliary unit.

Currently, head units have been made having one Bluetooth antenna and one receiver. These components allow the head unit to interface with Bluetooth enabled devices such as mobile phones. Provision of an additional Bluetooth antenna allows for a dedicated channel for the head unit to interface with a compatible multimedia asset, such as an auxiliary unit or cellphone.

An additional Bluetooth transceiver may be mounted within or on the head unit, and may be dedicated to interface with an electronic device, such as an auxiliary unit.

An auxiliary unit may be configured to fit adjacent or otherwise proximate the head unit, such as directly beneath the head unit, so as to use existing brackets to mount the two units together. There may be no need for additional fasteners or brackets to provide added multimedia assets to an existing head unit.

Conventional head units may not offer certain communication facilities, such as Internet access, satellite phone or radio communication, and the like. It may be impractical to reconsider the electronic configuration of the head unit to provide desired functionality. However, a second wireless transceiver within the head unit facilitates additional functionality, such as Internet access, to be added to the head unit. For example, the second wireless transceiver may be used to communicate with an auxiliary unit mounted proximate the head unit, or a cellphone, which may allow communications with remote networks or devices, such as through a modem or specialized wireless transceiver.

For example, the second wireless transceiver may be used to provide Internet access, through establishment of a communications link with an Internet enabled device such as a cell phone within the vehicle, or an auxiliary unit. Data can be streamed through the Internet enabled device, such as a cell phone, and then through the dedicated wireless communications link with the head unit, which may be a Bluetooth link.

The use of an auxiliary unit allows head unit functionality to be modified and improved without updating the electronic configuration of the head unit. This allows head unit design to have a longer operational life, and allows system upgrades and automobile option offerings to be varied as a function of auxiliary unit capability. For example, an auxiliary unit may be configured to add navigation capabilities, satellite radio, Internet access, hands-free communications with a cell phone, and other capabilities that may not be provided by the standard head unit. Similarly, the use of an auxiliary unit allows the ready upgrade of an existing head unit without the need to disturb the head unit mounting within a vehicle. For example, the head unit supplied with a vehicle may have excellent audio and CD playing capabilities. Later, a driver may desire additional functionality such as satellite radio that was not included in the original head unit. A user may then feel unhappy at having to remove an otherwise acceptable audio system in order to add a communications capability to the head unit. However, adding a second wireless transceiver to the head unit allows additional functionality to be added through a communications link between the second wireless transceiver and an external electronic device such as a cellphone or an auxiliary unit. The external electronic device may be a previously selected or predetermined device. The first wireless transceiver may be used to network or otherwise communicate with any other suitably configured electronic devices within the vehicle. This approach allows the head unit functionality to be flexibly configured even after the vehicle is supplied to a customer.

The second wireless transceiver may be a Bluetooth transceiver, in particular using a serial profile such as the Bluetooth SPP (Serial. Port Profile). An SPP profile is a Bluetooth connection profile that is available on a number of existing mobile electronic devices, such as cell phones with Bluetooth capability. An SPP profile may be used in the second Bluetooth transceiver, for example as a dedicated communications link between the head unit and the auxiliary unit. The first transceiver may have a wider bandwidth and/or additional capabilities. An SPP link may also be established between the auxiliary unit and mobile electronics within the vehicle.

BRIEF DESCRIPTION OF THE FIGURES

FIG. 5 shows a configuration allowing Internet access where such access is not available through the head unit alone.

DETAILED DESCRIPTION OF THE INVENTION

Figure 1:
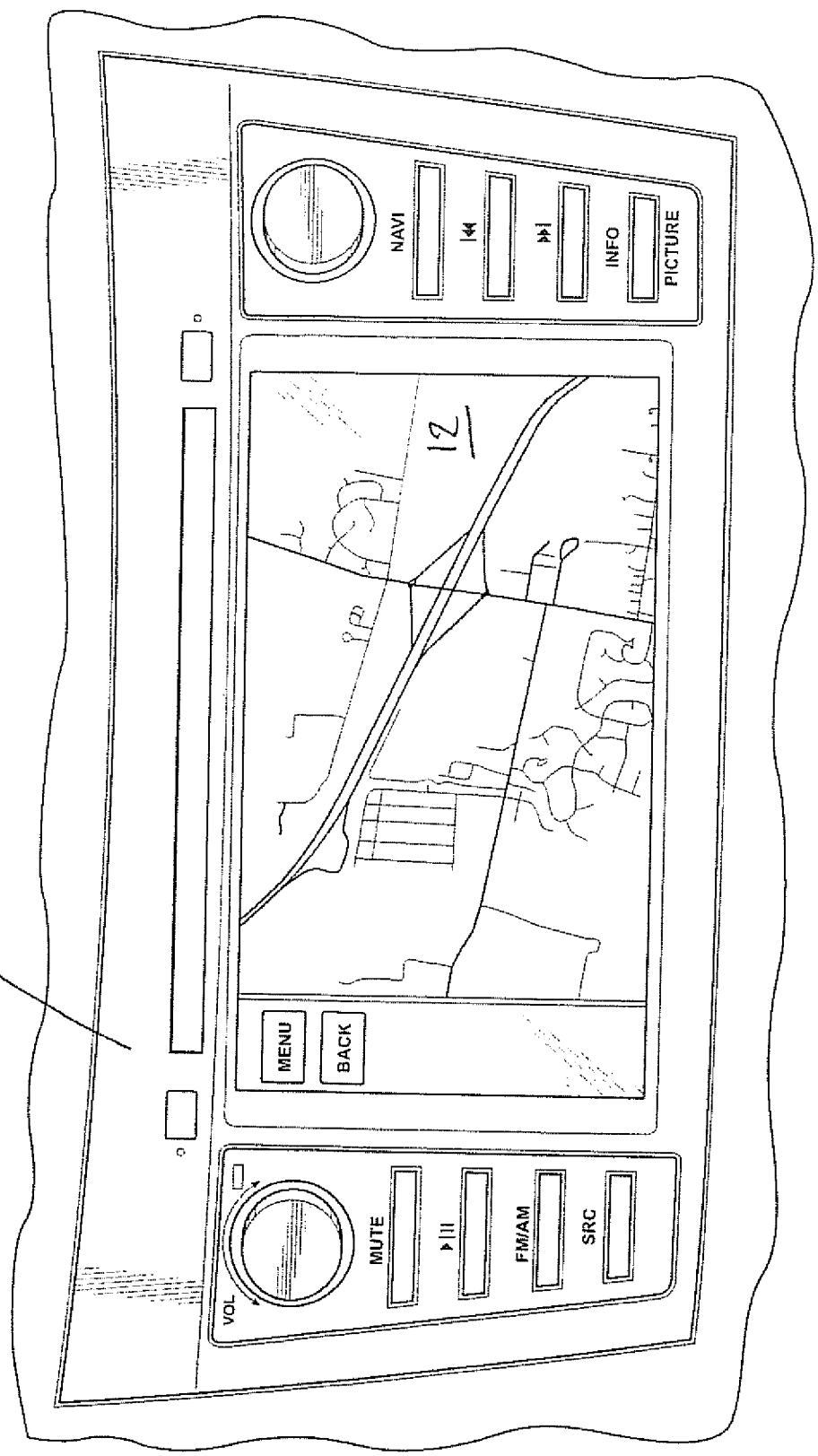
FIG. 1 (prior art) shows a head unit including visual display capabilities, in this case showing a navigational display.

In examples of the present invention, a vehicle head unit (a vehicle entertainment device) includes a dedicated wireless transmit and receive functionality for communicating with an external electronic device. The additional antenna may be a Bluetooth antenna, such as a Bluetooth SPP profile communications link.

An example apparatus is a head unit for a vehicle, the head unit having a housing, one or more of entertainment functionalities (such as one or more of the following functionalities: radio receiver (e.g. an AM, FM, and/or satellite radio), CD player, other audio player, audiovisual device, satellite phone or other satellite receiver), a first wireless transceiver operable to establish wireless communications with any suitably configured electronic devices within the vehicle (such as a mobile phone, portable navigational device, or other mobile electronic device including a transceiver configured to communicate with the first wireless transceiver); and a second wireless transceiver.

In some examples, the second wireless transceiver is operable to provide a dedicated communications link with an electronic device within the vehicle. The electronic device may be a predetermined electronic device, such as a mobile phone or auxiliary unit as described below.

The head unit may be configured to receive radio signals from an antenna, such as an external video receiver, and provide audio output signals that are conveyed to vehicle speakers.

In some cases, the head unit may include first and second Bluetooth transceivers, for example first and second transmit and/or receive antennas. Bluetooth, which is a trademark, is a wireless communications technology which is useful for providing communications links between mobile electronics. An example of Bluetooth communication is the Bluetooth hands-free profile that enables communications between the vehicle head unit and a mobile phone.

An SPP profile may be relatively inexpensive compared to communications profiles capable of video streaming. However, the provision of a dedicated communications link provides potentially extensive additional functionality to the head unit. The additional functionality may be achieved without any physical or electronic disturbance of the head unit.

The auxiliary unit may be located proximate the head unit, and may be mounted to the vehicle using shared brackets, or may directly mount to the head unit without the need for additional fasteners. A dedicated communications link is then established between the head unit and the auxiliary unit, for example using Bluetooth or similar wireless communications profiles.

The head unit may include a first Bluetooth antenna, for conventional communication with other Bluetooth enabled devices within the inside of a vehicle passenger compartment. For example, the head unit may communicate with mobile electronic devices such as iPhones, iPods, other portable music players, and mobile phones. This functionality may be similar to that of conventional head units. In addition to the first Bluetooth transceiver, an improved head unit includes a second additional Bluetooth transceiver which provides a dedicated communications channel to an external electronic device. In some examples, a serial profile such as the Bluetooth profile denoted SPP (Serial Port Profile) is used for the second Bluetooth transceiver. Other wireless protocols can be used instead of Bluetooth. The dedicated communications link may be a serial profile or other data profile.

In some examples, the external electronic device is an auxiliary unit. In other examples, the external electronic device may be a particular (e.g. predetermined) mobile electronic device in possession of a vehicle occupant. For example a dedicated communications link may be established between the head unit and a mobile phone, the communications link then being used to access data on the Internet through the mobile phone's Internet connection capability. Part of a head unit set-up process may be selection of an external electronic device with which the head unit forms a dedicated communications link using the second wireless transceiver.

There is a wide array of head units available for use in a vehicle. However, the installation of such devices may be complex, particularly if there are electronic connections to steering wheel controls or other difficult electronic connections. Skilled workers may be required to install or change an existing head unit within a vehicle.

After owning a vehicle for some period of time, such as a year, trends and fashions in mobile electronics may change and additional functionalities become apparent which a driver of the vehicle would then want to access. In the conventional approach, the only way to obtain such additional functionality would be to upgrade the head unit by replacing it. However this is difficult and expensive, and so it might be quite likely that the vehicle user is forced to forego a desired entertainment or other useful function simply because of the difficulties of upgrading the head unit.

Examples of the present invention overcome these conventional problems. The head unit includes an additional wireless communications capability by which a dedicated communications channel is established between the head unit and an external electronic device. In some examples, the external electronic device is an auxiliary unit which provides additional capabilities to the head unit. The additional capabilities may include satellite access, Internet access, phone network access, other network access, self-organizing vehicle communications networks, and the like.

In some approaches, the head unit is in communication with an auxiliary unit through a dedicated wireless channel provided by a wireless transceiver, and the auxiliary unit then establishes a communications link with an Internet enabled mobile electronic device within the vehicle. This may be a cell phone or any other device having Internet access. In this way, Internet access is added to the head unit, without the need for modification thereof. The wireless transceiver may be a second wireless transceiver provided in the head unit, configured for the purpose of forming a dedicated communications link with an external electronic device.

In another example approach, the external electronic device, such as an auxiliary unit or cellphone, includes Internet access capabilities, giving Internet access to the head unit through the communications link provided using the second wireless transceiver.

The auxiliary unit may be readily detachable and upgradable without disturbing the head unit. An auxiliary device may be mounted beneath the head unit, and may be hidden behind the vehicle fascia or the front of the head unit housing. In some examples, the auxiliary unit has a housing including at least one wireless transceiver and a control circuit, which may include a processor. A memory may be provided, optionally including a database of one or more user preferences or identifying information.

For example if data storage is required, an auxiliary unit may include a memory device, such as a memory card reader or solid state memory having a large data storage capability. In some examples, the data storage capability may be equivalent to one or more days of entertainment content. In some examples, the auxiliary unit may be removable by a user, and may be carried by a vehicle occupant away from the vehicle, for example for synchronization with a personal computer.

In some examples, a vehicle head unit or auxiliary unit may download entertainment content while the vehicle is stationary, through a wireless Internet access point. When driving, the wireless Internet access may be lost, so that caching of entertainment content is necessary for the person to enjoy the entertainment content while driving. An auxiliary unit may be configured to add storage capability to the head unit. This storage capability may be upgraded at any time through removal and upgrade of the auxiliary unit. The head unit and/or auxiliary unit may include a processor and support components capable of executing software to communicate with an external website. The head unit and/or auxiliary unit may include memory components storing identification information related to the user, such as a username and password for an external website.

In another example, entertainment content may be downloaded by the vehicle head unit using a communications link through the second antenna and through the auxiliary unit. The Bluetooth SPP (serial port profile) may be used for data streaming.

FIG. 1 (prior art) shows a head unit including an electronic display. The head unit 10 includes a radio, and also a navigation system by which maps can be shown on the display 12. The figure illustrates a vehicle entertainment interface, including various buttons and rotary controls as known in the art.

Figure 2:
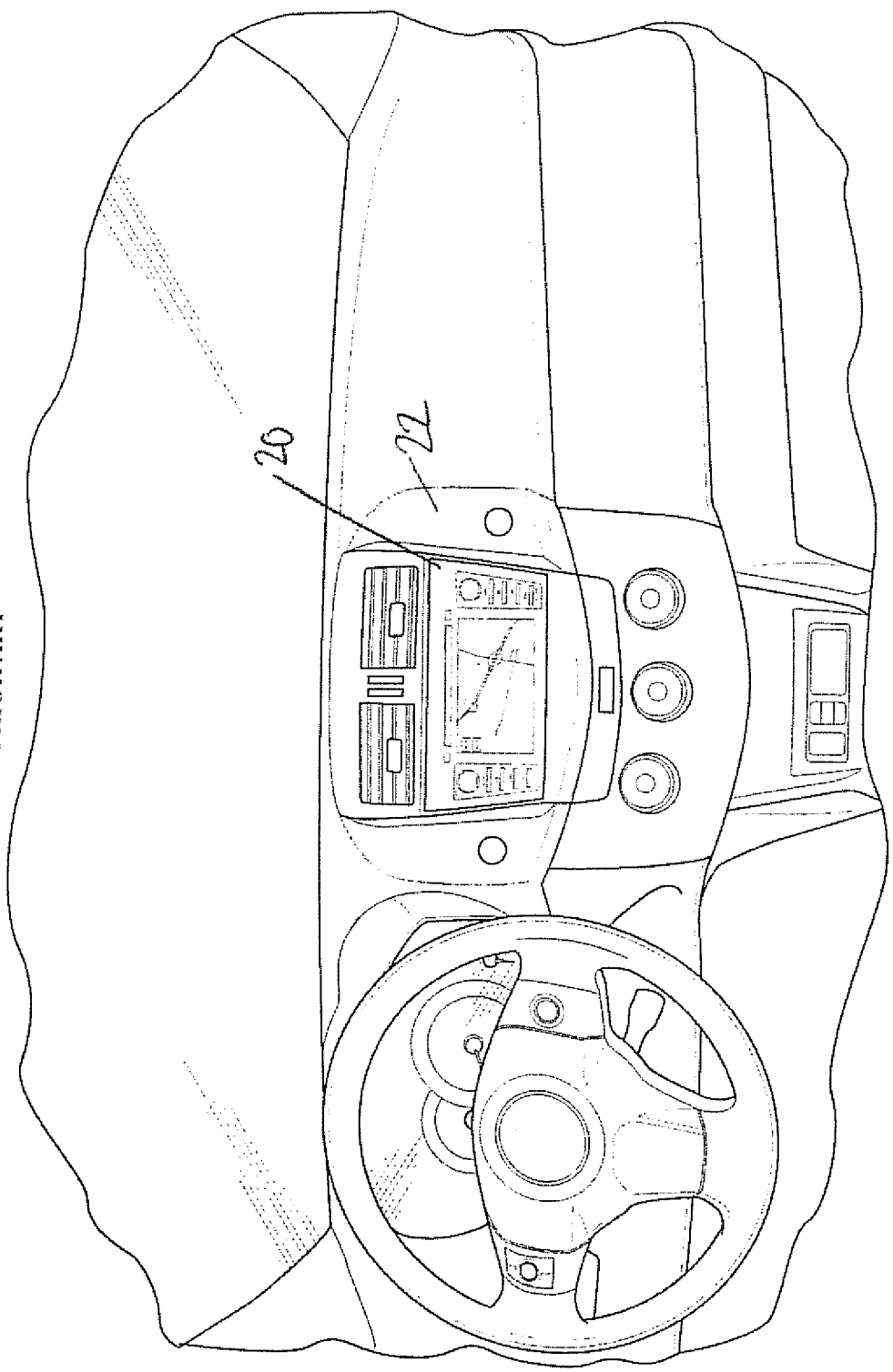
FIG. 2 (prior art) shows a head unit located within a central region of the vehicle fascia.

FIG. 2 (prior art) shows another head unit 20 located within the vehicle fascia 22. The head unit includes a radio, CD player, and optionally a satellite radio.

Figure 3:
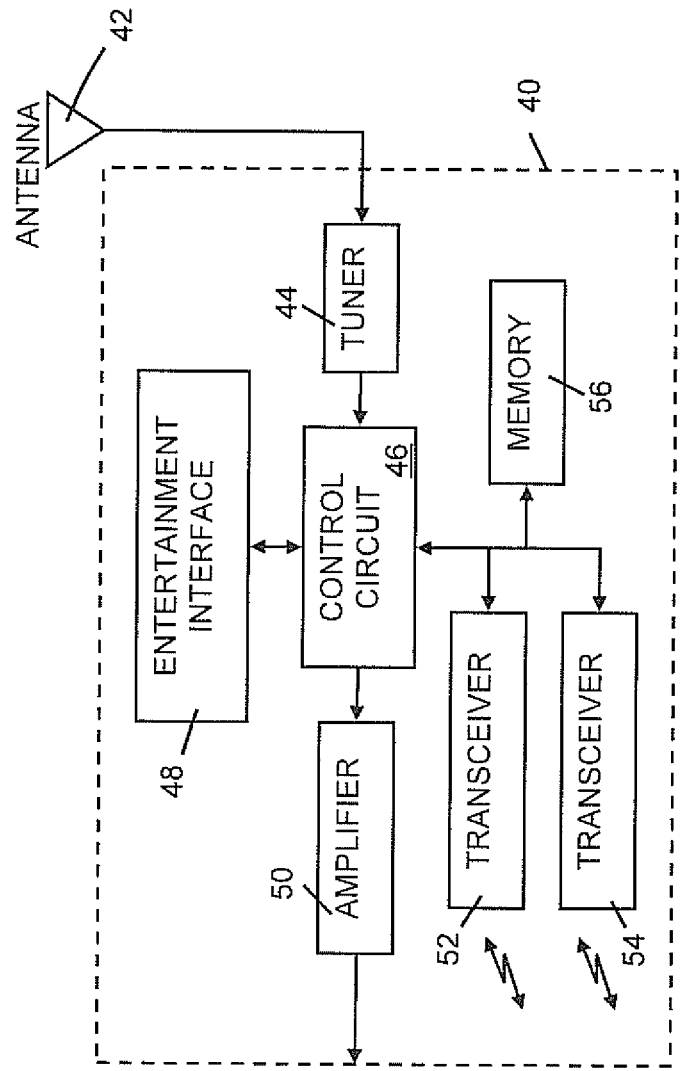
FIG. 3 shows a schematic of a head unit including a second Bluetooth antenna, which may be used to provide a dedicated wireless communications link to an auxiliary unit.

FIG. 3 show a schematic of an example head unit 40, including connection to vehicle antenna 42, tuner 44 receiving signals from antenna 42, control circuit 46, entertainment interface 48, amplifier 50, first wireless transceiver 52, second wireless transceiver 54, and memory 56. The control circuit 46 may include a processor and any necessary support components. The entertainment interface 48 may include a display, control inputs (such as buttons or dials), touch screen inputs, a microphone for receiving voice controls, and the like. The amplifier 50 provides audio signals to one or more vehicle speakers, and may be a stereo or quadraphonic amplifier. The first and second wireless transceivers 52 and 54 may both be Bluetooth transceivers.

Figure 4:
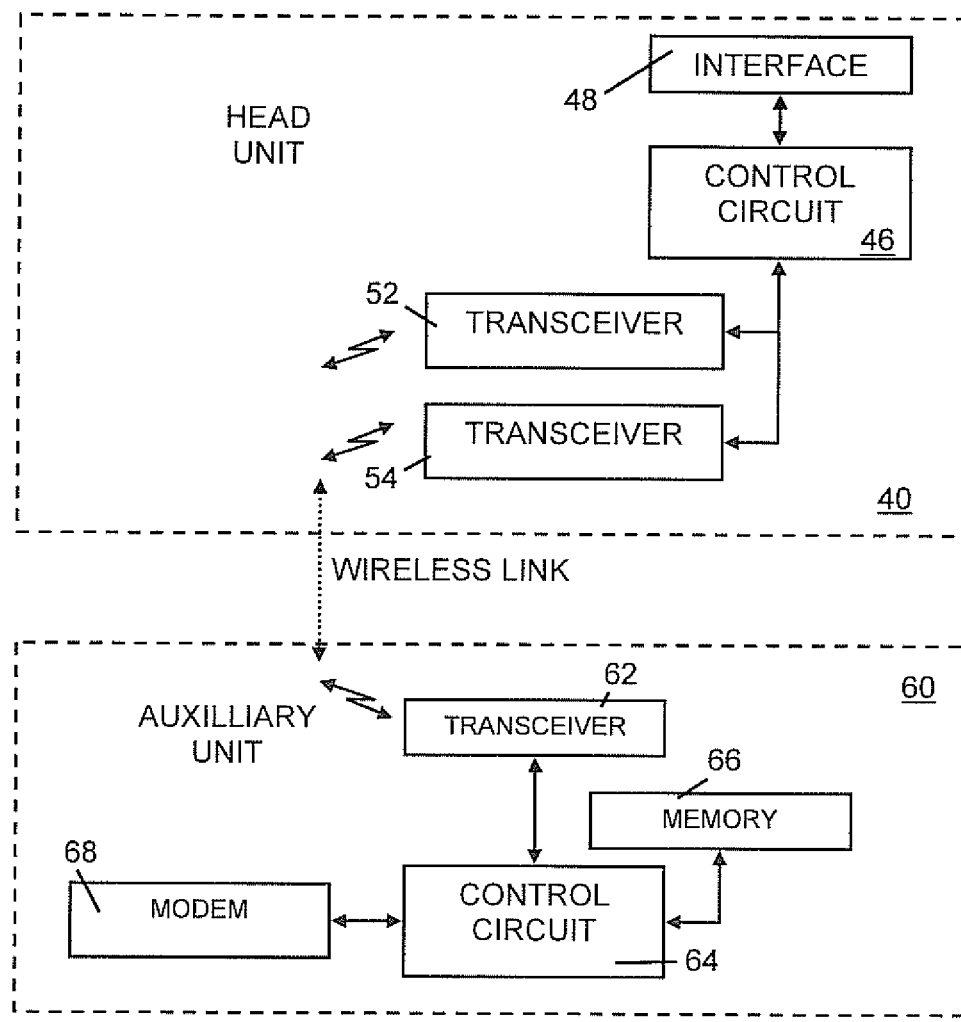
FIG. 4 shows a schematic of a head unit in communication with an auxiliary unit.

FIG. 4 shows a possible schematic of head unit in communication with an auxiliary unit. The figure shows a head unit 40, optionally including a radio and in communication with an external antenna. The head unit 40 includes first and second wireless transceivers 52 and 54, for example including Bluetooth antennas. The first transceiver 52 is configured for communication with mobile electronics within the vehicle, such as a cellphone (mobile phone) or other mobile electronic devices. In this example, the second wireless transceiver 54 provides a dedicated communications link to the auxiliary unit 60. The auxiliary unit includes a wireless transceiver 62 configured to communicate with the head unit, control circuit 64 (for example, including a processor and support components), memory 66, and wireless modem 68. In this configuration, the auxiliary unit may add Internet access to the head unit.

Each transceiver may include transmit and receive antennas, so that the head unit may include an additional (second) Bluetooth transmit antenna and an additional (second) Bluetooth receive antenna. The auxiliary unit similarly may include a Bluetooth transmit antenna and receive antenna. However, in some examples, the same antenna may be used for transmit and receive functions.

The auxiliary unit may then communicate with additional devices within the vehicle environment. For example the Bluetooth hands-free profile may be used to convey data over voice to and from a cell phone. The cell phone may execute an application to enable these profiles to be used. A link between an auxiliary unit and a cell phone may also be a Bluetooth PAN (personal area network) or DUN (dial-up network) tethering application. In addition, the auxiliary unit may have a dedicated Bluetooth SPP (serial port profile) communication with a cell phone, for example directly to an application running on the cell phone. This may allow the head unit to access the Internet through the Internet capabilities of the cell phone at any time. Such communications may be used to download data while the vehicle is moving, such as alerts and warnings that may enhance the driving experience.

The SPP profile may not generally be regarded as useful for allowing Internet access because of its bandwidth limitations. However such profiles may be established relatively inexpensively. For several applications, such as transmission and reception of numerical data and text based warnings, the SPP profile may be ideal.

FIG. 5 shows a configuration allowing Internet access where such access is not available through the head unit alone. A head unit (not shown) has a dedicated communications link with an auxiliary unit 60, the auxiliary unit 60 then having communication capabilities with a cell phone 70. Internet access is available through the data network, for example in communication with a cellular tower 72, allowing data to be received from the Internet and directed by the cell phone application (App) through the SPP connections through the auxiliary unit and to the head unit.

Various profiles may be available on the cell phone, such as the hands-free profile (HFP), personal area network (PAN), and dial-up network (DUN). These profiles allow relatively high bandwidth data exchange. However, the SPP profile is not often used, and in some examples is used as a dedicated link between the auxiliary unit and the cell phone, and also for the communications link between the auxiliary unit and the head unit. Hence, a head unit may include a first transceiver with a network and/or tethering profile, and a second transceiver with a serial port profile. In some examples, the second transceiver profile does not support network formation, but can only be used for communication with a single electronic device, which may be a predetermined device within the vehicle.

The figure shows HFP, PAN and/or DUN, and SPP profiles used to communicate between the auxiliary unit 60 and the cell phone 70. The cell phone 70 communicates with the cellular network using voice and/or data network. In some examples, the cellphone may be used as an auxiliary unit, for example having a dedicated SPP data link to the head unit.

The head unit may act as the primary entertainment source for vehicle occupants, including a radio and similar entertainment device. In some examples, a pair of wireless transceivers may be used to transmit first and second entertainment channels to different vehicle occupants. For example, the driver may listen to the radio, a first passenger may receive data on a mobile device through a first communications link, and a second passenger may receive data on a second mobile device through a second communications link.

An auxiliary unit may be configured to fit adjacent to the head unit, such as directly beneath the head unit, so as to use existing brackets to mount the two units together. The head unit may be physically proximate, such as adjacent, to the auxiliary unit. There may be no need for additional fasteners or brackets to secure an added multimedia asset, such as an auxiliary unit, to an existing head unit.

In some examples of the present invention, a first wireless transceiver in the head unit is used to form wireless communications links with any suitably equipped mobile electronic devices within the vehicle. A second wireless transceiver (such as a Bluetooth transceiver) is used to provide a dedicated communications link to an external electronic device, such as a cellphone or other mobile electronic device, or auxiliary unit, allowing enhanced functionality to be provided to the user through data received by the auxiliary unit (or other device), and transmitted to the head unit through the dedicated communications link.

An auxiliary unit may be used to provide additional functionality, such as Internet access, other network access, network creation, satellite communication, or other wireless communication protocol. For example, the auxiliary unit may allow communications with the Internet, and data exchanged with the Internet can be shared with the head unit using the second Bluetooth transceiver.

In other examples, an auxiliary unit allows Internet access using a cell phone or other mobile electronic devices, for example located within the vehicle. Data can be streamed through a cell phone, through a wireless communications link to the auxiliary unit, and then through the dedicated Bluetooth communications link with the head unit.

An auxiliary unit may be used to transmit and receive data through the user's phone to and from the Internet.

An auxiliary unit may include electronic circuitry operable to establish URLs, Bluetooth communications profiles, other wireless communications profiles as required, and data transmission and receiving as described herein.

The use of an auxiliary unit allows head unit functionality to be modified and improved without updating the configuration of the head unit. This allows head unit design to have a longer operational life, and allows system upgrades and automobile option offerings to be varied as a function of auxiliary unit capability. For example, an auxiliary unit may be configured to add navigation capabilities, satellite radio, Internet access, hands-free communications with a cell phone, and other capabilities that may not be provided by the standard head unit. Similarly, the use of an auxiliary unit allows the ready upgrade of an existing head unit without the need to disturb the head unit mounting within a vehicle.

For example, the head unit supplied with a vehicle may have excellent audio and CD playing capabilities. Later, a driver may desire additional functionality such as satellite radio that was not included in the original head unit. A user may then feel unhappy at having to remove an expensive and high quality audio system in order to add a communications capability to the head unit. A second wireless transceiver may be provided to communicate with an external electronic device such as an auxiliary unit or cellphone having the desired capability. This allows the functionality to be added to the head unit without removal or modification of the head unit. The use of the second wireless transceiver allows the entertainment system to be flexibly configured even after the vehicle is supplied to a customer, for example through selection and/or modification of an auxiliary unit or cellphone capabilities.

In some examples, a serial port profile (SPP profile) is used for the link between the head unit and an external electronic device using the second wireless transceiver, which may limit the data bandwidth but allows access to numerous useful applications. For example, an SPP profile may not be adequate for streaming movies, but may be very useful for conveying useful data to the driver, such as stock prices, weather alerts, traffic conditions, travel times, audio data such as music, and the like.

An SPP profile is a Bluetooth connection profile that is available on a number of existing mobile electronic devices, such as cell phones with Bluetooth capability. An SPP profile may be used in a second Bluetooth transceiver, for example as a dedicated communications link between the head unit and the auxiliary unit. An SPP link may also be established between the auxiliary unit and mobile electronics within the vehicle.

Conventional vehicle systems having Bluetooth capability have one antenna for accomplishing a variety of tasks. In some examples of the present invention, a second antenna may be provided purely for a dedicated channel for communication to and from the head unit and other electronic device, such as an auxiliary unit. The second antenna allows future expansion of head unit capabilities by way of upgrading or changing the auxiliary unit.

Bluetooth wireless transmission includes a number of different, standardized profiles. Some profiles only accomplish certain function, such as IMP, used for making hands free mobile calls, A2DP which is used for high quality, compressed audio transmission from one Bluetooth device (i.e. IPod) to the Bluetooth enabled head unit), and the like.

A Bluetooth antenna/receiver may not necessarily have ability to function with all the variety of Bluetooth profiles. A Bluetooth antenna/receiver may be hardcoded for different Bluetooth profiles. In some examples, the two antennas do not work simultaneously, e.g. if a first antenna is being used to make a hands free call, the second antenna with communications link to the auxiliary unit is not operating and vice-versa. The second wireless transceiver may be a dedicated antenna receiver for communication between the head unit and auxiliary unit.

The additional cost of a second wireless transceiver, such as an additional Bluetooth antenna, would appear to counter indicate this approach. However, the second transceiver may be relatively inexpensive, for example if only designed for the transmission and reception of serial data using e.g. the SPP profile. The second wireless transceiver may be incapable of supporting a hands-free call, audio streaming, or other capabilities provided by the first wireless transceiver. The second wireless transceiver may have lower power compared with the first transceiver, for example 50% lower power, and may operate on a different frequency. Hence, a second transceiver for creating a dedicated communications link, such as serial transmission of data between the head unit and other electronic device, may be significantly less expensive and less complex than a first transceiver used for a variety of functions (e.g. supporting two or more profiles).

The invention is not restricted to the illustrative examples described above. Examples described are not intended to limit the scope of the invention. Changes therein, other combinations of elements, and other applications will occur to those skilled in the art.

I claim:
1. A head unit for a vehicle entertainment system, the head unit having a video display and an audio output, the head unit comprising:
a first Bluetooth transceiver operating at a first frequency, having a network profile operable to establish wireless communication with any mobile electronic device having a device network profile and located within the vehicle; and a second Bluetooth transceiver operating a second frequency lower than the first frequency, the second Bluetooth transceiver only linked with an electronic device within the vehicle, the electronic device configured to transmit data at the second frequency.

2. The head unit of claim 1, wherein the second Bluetooth transceiver includes a serial port profile (SPP).

3. The head unit of claim 1, the electronic device being an auxiliary unit located proximate the head unit, the second Bluetooth transceiver providing a dedicated communications link with the auxiliary unit.

4. The head unit of claim 3, the auxiliary unit providing a network access to the head unit using the dedicated communications link.

5. The head unit of claim 4, the network access being an Internet access.

6. An entertainment system for a vehicle, the entertainment system comprising:

a head unit, including a housing, having a display for displaying video content and a radio, a first Bluetooth transceiver having a network profile operable to establish wireless communication with any mobile electronic device having a device network profile and located within the vehicle the first Bluetooth transceiver, the first Bluetooth transceiver operating on a first frequency, and a second Bluetooth transceiver operating on a second frequency, the second frequency less than the first frequency, and an auxiliary unit located proximate the head unit, the second Bluetooth transceiver providing a dedicated communications link solely between the head unit and the auxiliary unit.

7. The apparatus entertainment system of claim 6, the second Bluetooth transceiver is configured to prevent transmitting data received from a network profile.

8. The entertainment system of claim 6, the second Bluetooth transceiver having a serial port profile.

9. The entertainment system of claim 6, the first Bluetooth transceiver supporting a plurality of wireless profiles, the second wireless transceiver transmitting and receiving data only from a serial port profile.

\* \* \* \* \*